(12) United States Patent
Zait

(10) Patent No.: US 7,877,373 B2
(45) Date of Patent: Jan. 25, 2011

(54) EXECUTING ALTERNATIVE PLANS FOR A SQL STATEMENT

(75) Inventor: Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 283 days.

(21) Appl. No.: 11/484,108

(22) Filed: Jul. 10, 2006

(65) Prior Publication Data

US 2008/0010240 A1    Jan. 10, 2008

(51) Int. Cl.
*G06F 7/00* (2006.01)
*G06F 17/00* (2006.01)

(52) U.S. Cl. .................. 707/713; 707/715; 707/718; 707/719

(58) Field of Classification Search .............. None
See application file for complete search history.

(56) References Cited

U.S. PATENT DOCUMENTS

| | | | |
|---|---|---|---|
| 4,769,772 A | 9/1988 | Dwyer | |
| 4,803,614 A | 2/1989 | Banba et al. | |
| 4,829,427 A | 5/1989 | Green | |
| 4,956,774 A | 9/1990 | Shibamiya et al. | |
| 5,091,852 A | 2/1992 | Tsuchida et al. | |
| 5,251,131 A | 10/1993 | Masand et al. | |
| 5,287,459 A | 2/1994 | Gniewek | |
| 5,301,317 A * | 4/1994 | Lohman et al. ............. | 707/2 |
| 5,315,580 A | 5/1994 | Phaal | |
| 5,325,525 A | 6/1994 | Shan et al. | |
| 5,339,429 A | 8/1994 | Tanaka et al. | |
| 5,379,424 A | 1/1995 | Morimoto et al. | |
| 5,412,804 A | 5/1995 | Krishna | |
| 5,412,806 A | 5/1995 | Du et al. | |
| 5,444,820 A | 8/1995 | Tzes et al. | |
| 5,452,468 A | 9/1995 | Peterson | |
| 5,459,837 A | 10/1995 | Caccavale | |
| 5,469,560 A | 11/1995 | Beglin | |
| 5,495,419 A | 2/1996 | Rostoker et al. | |
| 5,495,606 A | 2/1996 | Borden et al. | |
| 5,504,894 A | 4/1996 | Fegurson et al. | |
| 5,537,588 A | 7/1996 | Engelmann et al. | |
| 5,551,027 A | 8/1996 | Choy et al. | |
| 5,572,640 A | 11/1996 | Schettler | |
| 5,574,900 A | 11/1996 | Huang et al. | |

(Continued)

OTHER PUBLICATIONS

Bergsten, et al., "Prototyping DBS3 a Shared-Memory Parallel Database System", IEEE 818622954, 226-234, 1991, pp. 226-234.

(Continued)

*Primary Examiner*—Khanh B Pham
*Assistant Examiner*—Azam Cheema
(74) *Attorney, Agent, or Firm*—Hickman Palermo Truong & Becker LLP; Marcel K. Bingham

(57) ABSTRACT

Under automated alternate plan analysis, a query optimizer generates candidate execution plans. The candidate execution plans are selected as alternate execution plans for the query and execution. Output describing characteristics of each alternate execution plan and/or its execution is generated and/or compared. From this information, it may be determined, for example, whether results returned by any of the alternate execution plans are the same and whether the least cost execution plan is actually the most efficiently executed.

28 Claims, 3 Drawing Sheets

U.S. PATENT DOCUMENTS

| | | | |
|---|---|---|---|
| 5,590,319 | A | 12/1996 | Cohen et al. |
| 5,642,515 | A | 6/1997 | Jones et al. |
| 5,671,403 | A | 9/1997 | Shekita et al. |
| 5,675,791 | A | 10/1997 | Bhide et al. |
| 5,680,547 | A | 10/1997 | Chang |
| 5,694,591 | A | 12/1997 | Du et al. |
| 5,710,915 | A | 1/1998 | McElhiney |
| 5,764,912 | A | 6/1998 | Rosborough |
| 5,765,150 | A | 6/1998 | Burrows |
| 5,787,251 | A | 7/1998 | Hamilton et al. |
| 5,794,227 | A | 8/1998 | Brown |
| 5,797,136 | A | 8/1998 | Boyer et al. |
| 5,822,748 | A | 10/1998 | Cohen et al. |
| 5,852,820 | A | 12/1998 | Burrows |
| 5,857,180 | A | 1/1999 | Hallmark et al. |
| 5,875,445 | A | 2/1999 | Antonshenkov |
| 5,918,225 | A | 6/1999 | White et al. |
| 6,009,265 | A | 12/1999 | Huang et al. |
| 6,026,390 | A | 2/2000 | Ross et al. |
| 6,026,391 | A | 2/2000 | Osborn et al. |
| 6,026,394 | A | 2/2000 | Tsuchida et al. |
| 6,061,676 | A | 5/2000 | Srivastava et al. |
| 6,205,451 | B1 | 3/2001 | Norcott et al. |
| 6,289,335 | B1 | 9/2001 | Downing et al. |
| 6,298,342 | B1 | 10/2001 | Graefe et al. |
| 6,334,128 | B1 | 12/2001 | Norcott et al. |
| 6,339,768 | B1 | 1/2002 | Leung et al. |
| 6,356,889 | B1 | 3/2002 | Lohman et al. |
| 6,356,891 | B1 | 3/2002 | Agrawal et al. |
| 6,370,524 | B1 | 4/2002 | Witkowski |
| 6,430,550 | B1 | 8/2002 | Leo et al. |
| 6,438,558 | B1 | 8/2002 | Stegelmann |
| 6,438,562 | B1 | 8/2002 | Gupta et al. |
| 6,529,896 | B1 | 3/2003 | Leung et al. |
| 6,529,901 | B1 | 3/2003 | Chaudhuri et al. |
| 6,684,203 | B1 | 1/2004 | Waddington et al. |
| 6,694,306 | B1 | 2/2004 | Nishizawa et al. |
| 6,807,546 | B2 * | 10/2004 | Young-Lai ............... 707/102 |
| 6,901,405 | B1 | 5/2005 | McCrady et al. |
| 6,934,699 | B1 | 8/2005 | Haas et al. |
| 6,941,360 | B1 | 9/2005 | Srivastava et al. |
| 6,954,776 | B1 | 10/2005 | Cruanes et al. |
| 6,961,729 | B1 | 11/2005 | Toohey et al. |
| 6,980,988 | B1 | 12/2005 | Demers et al. |
| 6,990,503 | B1 | 1/2006 | Luo et al. |
| 7,089,225 | B2 | 8/2006 | Li et al. |
| 7,234,112 | B1 * | 6/2007 | Brown et al. ............. 715/713 |
| 7,246,108 | B2 | 7/2007 | Ahmed |
| 7,383,247 | B2 * | 6/2008 | Li et al. .................... 707/2 |
| 2001/0047372 | A1 | 11/2001 | Gorelik et al. |
| 2002/0038313 | A1 | 3/2002 | Klein et al. |
| 2002/0138376 | A1 | 9/2002 | Hinkle |
| 2002/0188600 | A1 * | 12/2002 | Lindsay et al. ............. 707/3 |
| 2003/0135480 | A1 | 7/2003 | Van Arsdale et al. |
| 2003/0159136 | A1 | 8/2003 | Huang et al. |
| 2003/0212668 | A1 * | 11/2003 | Hinshaw et al. ............ 707/3 |
| 2003/0229639 | A1 * | 12/2003 | Carlson et al. ........... 707/100 |
| 2004/0220911 | A1 | 11/2004 | Zuzarte et al. |
| 2005/0028134 | A1 * | 2/2005 | Zane et al. ............... 717/106 |
| 2005/0055382 | A1 | 3/2005 | Ferrat et al. |
| 2005/0187917 | A1 | 8/2005 | Lawande et al. |
| 2005/0198013 | A1 | 8/2005 | Cunningham et al. |
| 2005/0234965 | A1 | 10/2005 | Rozenshtein et al. |
| 2005/0283471 | A1 | 12/2005 | Rafi |
| 2006/0026115 | A1 | 2/2006 | Ahmed |
| 2006/0026133 | A1 | 2/2006 | Ahmed |
| 2006/0041537 | A1 | 2/2006 | Rafi |
| 2006/0129542 | A1 * | 6/2006 | Hinshaw et al. ............ 707/3 |
| 2006/0218123 | A1 * | 9/2006 | Chowdhuri et al. ......... 707/2 |
| 2008/0228710 | A1 * | 9/2008 | Muras ..................... 707/2 |
| 2009/0077016 | A1 | 3/2009 | Belknap et al. |
| 2009/0077017 | A1 | 3/2009 | Belknap et al. |

OTHER PUBLICATIONS

Bhide, Anupam, "An Analysis of Three Transaction Processing Architectures", Computer Science Division, UC Berkeley, Proceeding of the 14$^{th}$ VLDB Conference,1998, pp. 339-350.

Copeland, George et al., "Data Placement in Bubba," ACM 0897912683, 1988, pp. 99-108.

Dayal, Umeshwar, "Of Nests and Trees: A Unified Approach to Processing Queries That Contain Nested Subqueries, Aggregates and Quantifiers", Proceedings of the 13$^{th}$ VLDB Conference, Brighton 1987, pp. 197-208.

Dewitt, et al., "A Performance Analysis of the Gamma Database Machine," Computer Sciences Department, University of Wisconsin, 1988, pp. 350-360.

Englert, Susan et al., "A Benchmark of NonStop SQL Release 2 Demonstrating Near-Linear Speedup and Scaleup on Large Databases", Technical Report 89.4, Tandem Part No. 27469, May 1989, pp. 1-23.

Graefe, Goetz, "Encapsulation of Parallelism in the Volcano Query Processing System," Mar. 1990, pp. 102-111.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Leverenz et al., "Oracle 8i Concepts Release 8.1.5- A67781-01'", Oracle Corporation, Feb. 1999, located on the internet at <http://www.csee.umbc.edu/help/oracle8/server.815/a67781/toc.htm>, 122 pages.

Lumpkin, George et al., "Query Optimization in Oracle 9/", Oracle Corporation, Oracle White Paper, Feb. 2002, pp. 1-30.

Pirahesh, Hamid, et al., "Extensible/Rule Base Query Rewrite Optimization in Starburst", IBM Almaden Research Center.

Selinger, P. Griffiths, et al., "Access Path Selection in a Relational Database Management System", Proceedings of the 1979 ACM SIGMOD International Conference on the Management of Data, 1979, pp. 23-34.

Stonebraker, Michael, et al. "The Design of XPRS," Proceedings of the 14$^{th}$ VLDB Conference, 1988, pp. 318-330.

Tandem, "A Benchmark of NonStop SQL on the Debit Credit Transaction", The Tandem Performance Group, 1988, pp. 337-341.

Borla-Salamet, Pascale, "Compiling Control into Database Queries for Parallel Execution Management," IEEE Conference on Parallel Distributed Information Systems, 1991, ISBN 0-8186-2295-4, pp. 271-279.

Chaudhuri, Surajit et al., "Including Group-By in Query Optimization," Proceedings of the 20$^{th}$ VLDB Conference—1994, pp. 354-366.

Galindo-Legaria, Cesar et al., "Outerjoin Simplification and Reordering for Query Optimization," ACM Transactions on Database Systems, vol. 22, No. 1, Mar. 1997, pp. 43-74.

Erickson, Gail et al., "Improving Performance with SQL Server 2000 Indexed Views," Microsoft TechNet, Sep. 2000, located on the Internet at http://www.microsoft.com/technet/prodtechnol/sql/2000/maintain/indexvw.mspx?pf=true, retrieved on Nov. 11, 2006, 14 pages.

Mishra, Priti et al., "Join Processing in Relational Databases," ACM Computing Surveys, vol. 24, No. 1, Mar. 1992, pp. 63-113.

Muralikrishna, M., "Improved Unnesting Algorithms for Join Aggregate SQL Queries," Proceedings of the 18$^{th}$ VLDB Conference—1992, pp. 91-102.

Seshadri, Preveen, "Cost-Based Optimization for Magic: Algebra and Implementation," SIGMOND '96, 1996 ACM 0-89791-794-4, pp. 435-446.

Gopalkrishnand, Vivikanand, et al., "Issues of Object-Relational View Design in Data Warehousing Environment", IEEE 1998, pp. 2732-2737.

Kung, Chenho, "Object Subclass Hierarchy in SQL: A Simple Approach", Communications of the ACM, Jul. 1990, vol. 33, No. 7, pp. 117-125.

Bello, Randall G., et al., "Materialized Views in Oracle", VLDB 1998, Proceedings of 24th International Conference on Very Large Databases, Aug. 24-27, 1998, pp. 659-664.

Najjar, Faiza, et al., "Cardinality estimation of distributed join queries", Database and Expert Systems Applications, Proceedings of the Tenth International Workshop, dated Sep. 1-3, 1999, pp. 66-70.

Moro, Gianluca, et al., "Incremental maintenance of multi-source views", Database Conference, 2001, ADC 2001, Proceedings, 12th Australasian, Jan. 2001, pp. 13-20.

Ahmed, Rafi, et al., "Cost-Based Query Transformation in Oracle," Copyright 2006 VLDB, ACM 1595933859, pp. 1026-1036.

Deutsch, Alin et al., "Minimization and Group-By Detection for Nested XQueries", University of California, San Diego, 2003, 15 pages.

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

Oracle, "Optimizer Modes, Plans Stability, and Hints", Oracle8i Tuning Release 8.1.5 A67775-01, Oracle Website, 1999, 54 pages.

Gopalkrishnand, Vivikanand, et al. "Issues of Object-Relational View Design in Data Warehousing Environment," IEEE 1998, 0780347781, pp. 2732-2737.

Kung, Chenho, "Object Subclass Hierarchy in SQL: A Simple Approach," Communications of the AC, Jul. 1990, vol. 33, No. 7, pp. 117-125.

Bello, Randall G. et al. "Materialized Views in Oracle," VLDB '98, Proceedings of 24th International Conference on Very Large Data Bases, Aug. 24-27, 1998, New York City, New York, USA, pp. 659-664.

Najjar, Faiza et al. "Cardinality estimation of distributed join queries," Sep. 1-3, 1999; Database and Expert Systems Applications, 1999, Proceedings, Tenth International Workshop on, pp. 66-70.

Moro, Gianluca et al. "Incremental maintenance of multi-source views," Database Conference, 2001, ADC 2001, Proceedings, 12th Australasian, Jan. 2001, pp. 13-20.

Oracle® Database Performance Tuning Guide 10g Release 2 (10.2) "Using Plan Stability" pp. 18-1 to 18-10, 10gR2 released Jul. 11, 2005.

\* cited by examiner

EXECUTING ALTERNATIVE PLANS FOR A SQL STATEMENT

RELATED APPLICATIONS

The present application claims priority to U.S. Provisional Application No. 60/817,998, entitled Executing Alternative Plans For A SQL Statement, filed on Jun. 30, 2006 by Mohamed Zait, the entire content of which is hereby incorporated by reference for all purposes as if fully set forth herein.

FIELD OF THE INVENTION

The present invention relates to database systems, and in particular, to optimization of queries executed by a database system.

BACKGROUND

Relational and object-relational database management systems store information in tables of rows. To retrieve data, queries that request data are submitted to a database server, which computes the queries and returns the data requested.

Queries submitted to the database server must conform to the syntactical rules of a particular query language. One popular query language, known as the Structured Query Language (SQL), provides users a variety of ways to specify information to be retrieved.

Queries submitted to a database server are evaluated by a query optimizer. Based on the evaluation, the query optimizer generates an execution plan that defines steps for executing the query. Typically, the query optimizer generates an execution plan optimized for efficient execution.

Several problems can arise with execution plans generated by query optimizers. First, the execution plans may not generate the correct the results. Second, an optimizer execution plan may in fact perform poorly.

Determining the root cause of problems with execution plans can be very complicated and tedious. In fact, even detecting such problems can be difficult.

Based on the foregoing, there is a clear need for developing techniques that facilitate detecting and solving problems with execution plans.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

When a query optimizer evaluates a query statement, it determines various "candidate execution plans" and estimates a query execution cost ("estimated query cost") for each. The candidate execution plan with the lowest estimated query cost is assumed to be most efficient and thus is selected by the query optimizer for execution.

The query may be transformed into one or more transformed queries. For the query and one or more of the transformed queries, various candidate execution plans are generated, each, for example, using different join and access operations and/or performing the operations in a different order.

Various problems may be encountered during query optimization. Structures that represent the query may be corrupted when manipulated to transform a query. Query transformations and/or the execution plans may not return the correct results, and the execution plan with the least cost may not in fact be the most efficient execution plan.

To facilitate resolving such problems, an automated solution referred to as alternate plan analysis, generates information useful to resolving these problems. Under this approach, for a given query, a subset of candidate execution plans generated by a query optimizer are selected as alternate execution plans for the query and executed. Output describing characteristics of each alternate execution plan and/or its execution is generated for comparison. From this information, it may be determined, for example, whether results returned by any of the alternate execution plans are the same and whether the least cost execution plan is actually the most efficiently executed.

Illustrative Operational Environment

Figure 1:
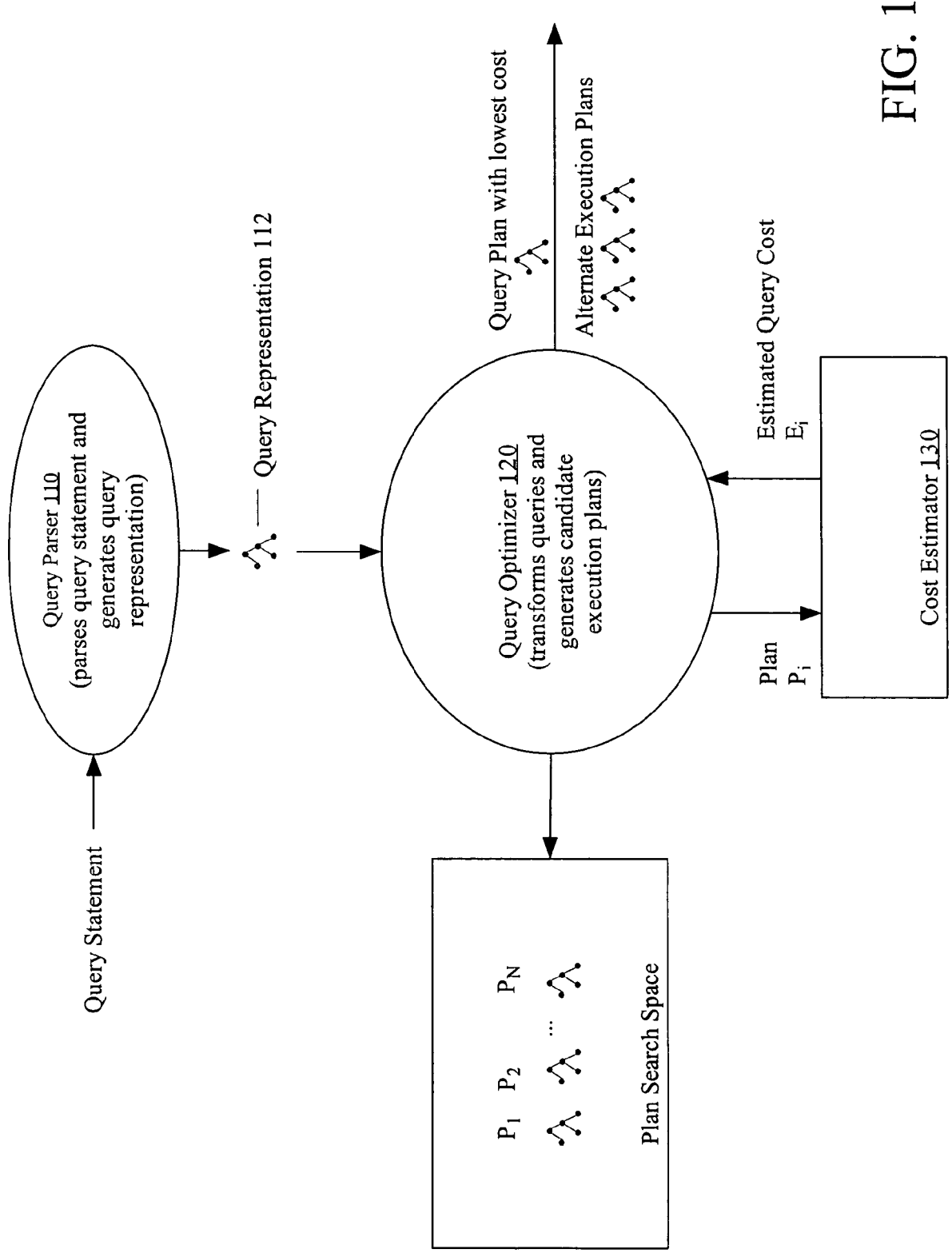
FIG. 1 is a diagram of a query optimizer according to an embodiment of the present invention.

FIG. 1 is a diagram depicting a query optimizer and related components within a database server (not shown). Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10 g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimizer and Execution Plans

Referring to FIG. 1, query parser 110 receives a query statement and generates an internal query representation 112 of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by query optimizer 120.

Query optimizer 120 generates one or more different candidate execution plans for a query, which are evaluated by query optimizer 120 to determine which should be used to compute the query. The one or more candidate execution plans that are evaluated for this purpose are collectively referred to as the plan search space or search space. For a given query, a search space may include candidate execution plans $P_1$, $P_2$ through $P_N$.

Execution plans may be represented by a graph of interlinked nodes, referred to herein as operators, that each correspond to a step of an execution plan, referred to herein as an execution plan operation. The hierarchy of the graphs represents the order in which the execution plan operations are performed and how data flows between each of the execution plan operations. Execution plan operations include, for example, a table scan, an index scan, hash-join, sort-merge join, nested-loop join, and filter.

To evaluate the candidate execution plans in the search space, query optimizer 120 estimates a cost of each candidate execution plan and compares the estimated query costs to select an execution plan for execution. In an embodiment, the estimated query cost is generated by a query cost estimator 130, which may be a component of query optimizer 120. For a plan $P_i$ supplied by query optimizer 120, cost estimator 130 computes and generates an estimated query cost $E_i$. In general, the estimated query cost represents an estimate of computer resources expended to execute an execution plan. The estimated cost may be represented as the execution time required to execute an execution plan.

Estimating query cost can be very complex. For example, to generate an estimated query cost, query cost estimator 130 may estimate cardinality (the number of rows to scan and process), selectivity (the fraction of rows from a row set filtered by a predicate), and cost in terms of resources such as disk input and output, CPU usage, and memory usage of various execution plan operations. The accuracy of these estimates depends on statistic about tables (e.g. histograms) as well other statistics.

To determine which candidate execution plan in the search space to execute, query optimizer 120 selects the candidate execution plan with the lowest estimated cost. To perform alternate plan analysis, query optimizer 120 may select multiple candidates for execution. Each of the selected candidates is referred to herein as an alternate execution plan.

Query optimizer 120 may optimize a query by transforming the query. In general, transforming a query involves rewriting a query into another query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

The query as transformed is referred to herein as the transformed query. The query is rewritten by manipulating a copy of the query representation to form a transformed query representation representing a transformed query.

One or more alternate transformations may be performed, and for each alternate transformation, one or more candidate execution plans are generated. Thus, a search space may contain candidate execution plans for multiple transformations, and multiple candidate execution plans for a single query transformation.

Alternate Plan Analysis Overview

Figure 2:
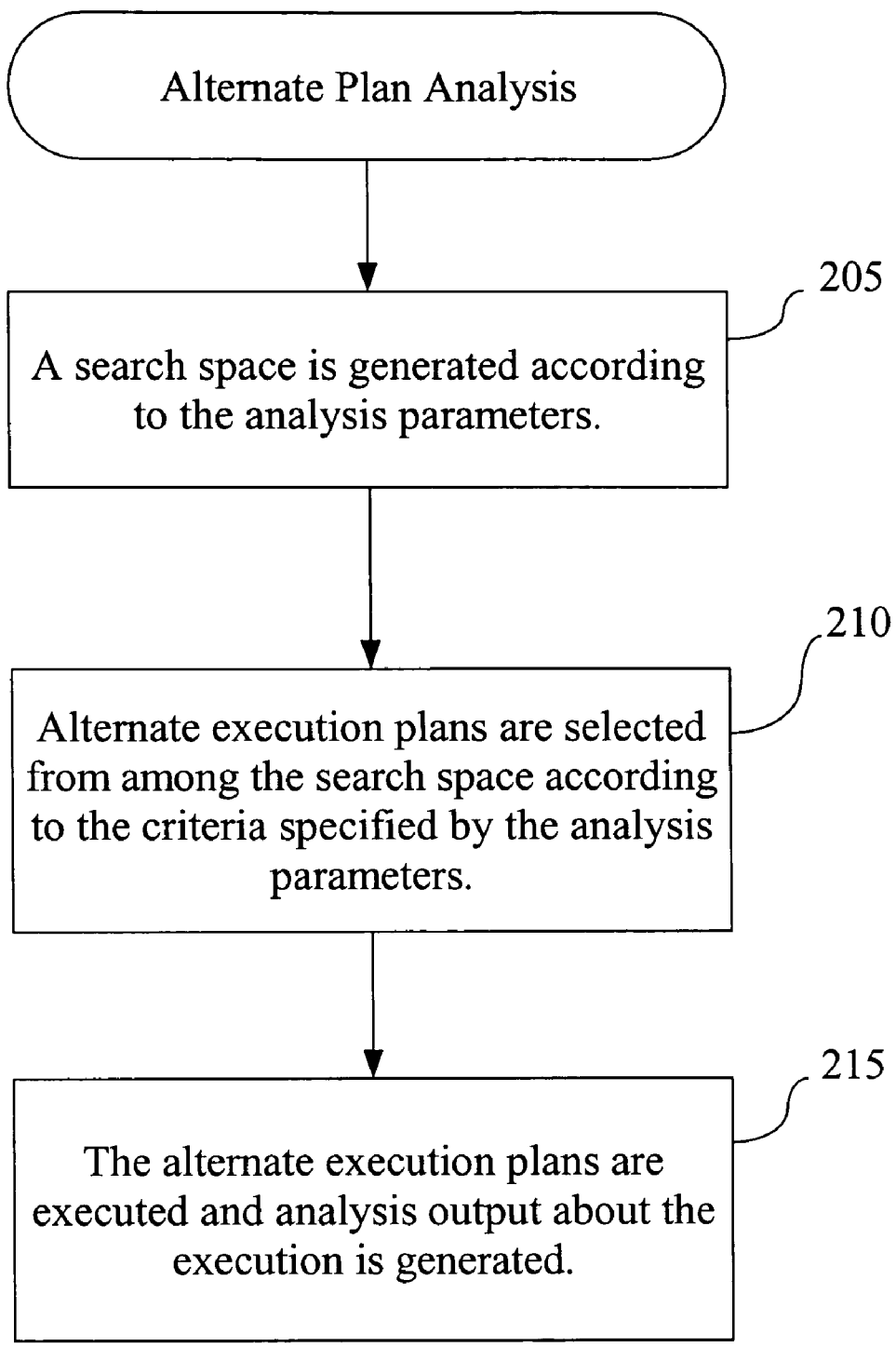
FIG. 2 depicts a procedure for automatically performing alternate query analysis according to an embodiment of the present invention.

FIG. 2 is a flowchart depicting a procedure for performing alternate query plan analysis, according to an embodiment of the present invention. The procedure is executed for each query in a set of one or more queries referred to herein as the working query set. The working query set can be provided as input by an end user.

According to an embodiment, the procedure is controlled by "analysis parameters." Analysis parameters describe how alternate plan analysis is performed. For example, the analysis parameters may specify ranking criteria for selecting the alternate execution plans from among the candidate execution plans and how many of the top ranked candidate execution plans to select as alternate execution plans for alternate query analysis. The analysis parameters may govern what kind of information to generate about the execution of the alternate execution plans. A type of analysis parameter, referred to herein as an optimizer parameter, specifies the optimization behavior query optimizer 120 should follow. Optimization behavior refers to the way a query optimizer optimizes, e.g. what types of transforms to make or not make, what types of execution plan operations to use or not use, and what order and organization of execution plan operators to use or not use.

Analysis parameters may be provided as input from a user. This allows users to control and tailor the operation of alternate query analysis.

The steps depicted in FIG. 2 are performed iteratively for each query in a working query set. The particularly query in the working set for which the iteration is being performed is referred to herein as the current query.

At steps 205, a search space is generated according to the analysis parameters. For example, if the analysis parameters include an optimizer parameter that specifies not to perform specific query transformations, then the query optimizer foregoes the transformations and the search space does not include candidate execution plans for such transformed queries. If the optimizer parameters include an optimizer parameter to exclude certain operators in execution plans, then the query optimizer foregoes generating candidate execution plans using such operators.

At step 210, alternate execution plans are selected from among the search space according to the criteria specified by the analysis parameters. For example, an analysis parameter may specify to select the five candidate execution plans with the lowest estimated costs. The alternate execution plans selected for execution are referred to herein as the alternate plan set.

At step 215, the alternate execution plans in the alternate plan set are executed and analysis output about the execution is generated. Analysis output can include information describing characteristics of an alternate execution plan and its execution, such as the performance realized during execution and whether any errors were encountered, and details about the execution plan operations in the alternate execution plans and any query transformations upon which the alternate execution plan is based.

Top-Ranked Comparison

A mode of operation for alternate plan analysis is referred to herein as top-ranked comparison. In one example of top-ranked comparison, the candidate execution plans with the top N, lowest estimated query costs are selected for the alternate plan set. This mode may be specified by an analysis parameter. The analysis output for a given query may show the performance realized for each alternate execution plan and its estimated cost. Such information shows how strongly the estimated query costs correlate to realized performance and how well the optimizer selects the optimal plan.

For example, for a given query in the working set, where N equals 10, 10 alternate execution plans P1 . . . P10 are selected. The analysis output generated for the alternate plan set is shown below.

TABLE AR1

| PLAN | Cost Estimate | Actual Execution Time |
|------|---------------|-----------------------|
| P1   | 2.0           | 2.5                   |
| P2   | 1.5           | .7                    |
| P3   | 1.8           | 1.7                   |
| P4   | 1.0           | .9                    |
| P5   | 2.3           | 2.7                   |
| ...  | ...           | ...                   |

The estimated query costs and actual execution times of the plans not shown above, i.e. plans P6 through P10, are higher than any of those shown above for P1 through P5. According to the above table AR1, based on estimated query costs, a query optimizer would select plan P4, because the estimated cost is 1.0 seconds. However, the fastest plan executed was plan P2. Although P2 had a cost estimate of 1.5 seconds, which is greater than that of P4's, P2's actual execution time is 0.7 seconds, less than the 0.9 second actual execution time of plan P4. Nevertheless, the analysis output shows that the alternate execution plan with the lowest cost estimate was one of the top two performing alternate execution plans.

Analysis output for the whole working set provides a more overall indication of the performance of the query optimizer. For example, a review of the analysis output for the whole working set shows that query optimizer selects from among the alternate execution plans in the alternate plan sets, the top two actual performing alternate execution plans 50% of the time, and the top five 75% of the time.

More generally, the ranking criteria of the top-rank mode may be based on other metrics other than estimated query cost. Other metrics include, for example, estimated memory usage or a number of joins of a certain type called for by a candidate execution plan. For example, if the ranking criteria were based on memory usage, then the plans using the top ranked amount of memory (i.e. lowest amount) may be selected. The metric upon which ranking criteria is based can be specified by an analysis parameter. Also, analysis parameters may specify N as a constant or a percentage.

In another embodiment, one or more randomly selected alternate execution plans may also be included in the alternate plan set.

Result Set Comparison Mode

In an embodiment, the result sets computed for each alternate execution plan in an alternate plan set are compared to determine whether the result sets are equal. Unequal result sets indicate that at least one alternate execution plan is not computing the query results correctly. Incorrect results are often a symptom of a query transformation problem. The result set comparison mode may be controlled by an analysis parameter.

The equality or inequality of result sets may be determined by generating a checksum for the result set or generating a hash value by applying a hash function to the result set. Different checksums or hash values indicate different result sets. The analysis output may indicate which alternate computed the same results and which computed different results.

Version Mode

Like software products in general, software that implements query optimization and related functions evolves between versions. Each version may implement different ways of transforming queries, generating search spaces, and estimating query cost. According to an embodiment, query optimizer 120 is configured to operate as it did at a particular version. As a result, alternate query analysis can generate and compare alternate execution plans generated for different versions. This ability facilitates detecting what version of a query optimizer may have introduced errors or inefficiencies.

For example, software for query optimization has evolved through five versions. A query ran efficiently in an earlier version. For the query, the analysis parameters may be set to generate an alternate execution plan for each version. The analysis output may identify the alternate execution plan generated for each version and its actual execution time, revealing, for example, that for the version were execution time degraded, a different alternate execution plan was selected by the query optimizer as the one with the lowest cost, and that the new selected alternate execution plan implemented a query transformation introduced in that version.

An optimizer parameter may specify to generate alternate execution plans for specific versions or for all versions between a range of versions.

Finer Grained Control of Optimization Behavior

The version mode represents a coarser-grained way of controlling optimization behavior. According to an embodiment, optimization features may be controlled at a finer level of granularity. The use of certain transformations or execution plan operations may be controlled by a specific parameter. For example, an optimizer parameter may specify that a certain transformation should be enabled, not enabled, or should not be used under certain conditions.

Conditional Analysis Output

According to an embodiment, the content of analysis output depends on conditions detected and/or results generated during alternate query analysis. For example, alternate query analysis is performed to compare the least costly alternate execution plan generated each version in a range of versions. An analysis parameter may specify that if for any query in the working query set the performance of an alternate execution plan for the most recent version has degraded, then the analysis output for the query should include information about what alternate execution plans were selected, what transformations were performed, the estimated query costs and actual execution time, and other information useful to diagnose the reason underlying the degraded performance.

As another example, alternate query analysis is performed to determine the top-ranked alternate execution plans. If under result comparison a difference in the computed results of alternate execution plans for a query is detected, then the analysis output includes more detailed information for the alternate execution plans of the query.

Automated Query Analysis Tool

According to an embodiment of the present invention, a software tool, separate and apart from the query optimizer, controls alternate query analysis. The query analysis tool reads the analysis parameter as input and performs the alternate query analysis accordingly, interacting with a query optimizer to control optimization behavior and how the query optimizer selects alternate execution plans from the search space to return to the tool for execution.

To control optimization behavior, the tool may embed optimizer hints within queries that the tool submits to the query optimizer. Optimizer hints are commands that may be embedded within a query statement to specify to a query optimizer what optimizations to perform or not perform e.g. what execution plan operations to use or not use and what query transforms to perform or not perform. The tool may also control optimization behavior by changing the query compilation environment.

The tool executes each of the alternate execution plans returned by the query optimizer and generates analysis output based on the results of the execution.

The query analysis tool automates many tasks that would be extremely onerous to perform manually. Regression testing, for example, is an area that would benefit enormously from the tool. Under regression testing, queries issued by an application to a database server may be tested to determine whether they run correctly or as efficiently as previously. An application could have thousands and thousands of such queries.

To perform the regression testing manually, a user may manually submit the queries to both the old and new database servers for execution and compare the results and performance of all these query executions. Under approaches described herein, the queries of an application are used to form a working set. Next, alternate query analysis is run under the version mode and result comparison mode to automatically detect queries with degraded performance or queries that are producing different results.

The task of manually generating and running alternate execution plans for comparison is also an onerous task to perform manually. Often, a combination of optimizer hints is needed to create a particular execution plan for a query to force or prevent particular query transformations. Determining the combination of optimizer hints needed and embedding them within a query statement can be very complex, a task further compounded by having to do this for all alternate execution plans needed for comparison purposes.

Hardwire Overview

Figure 3:
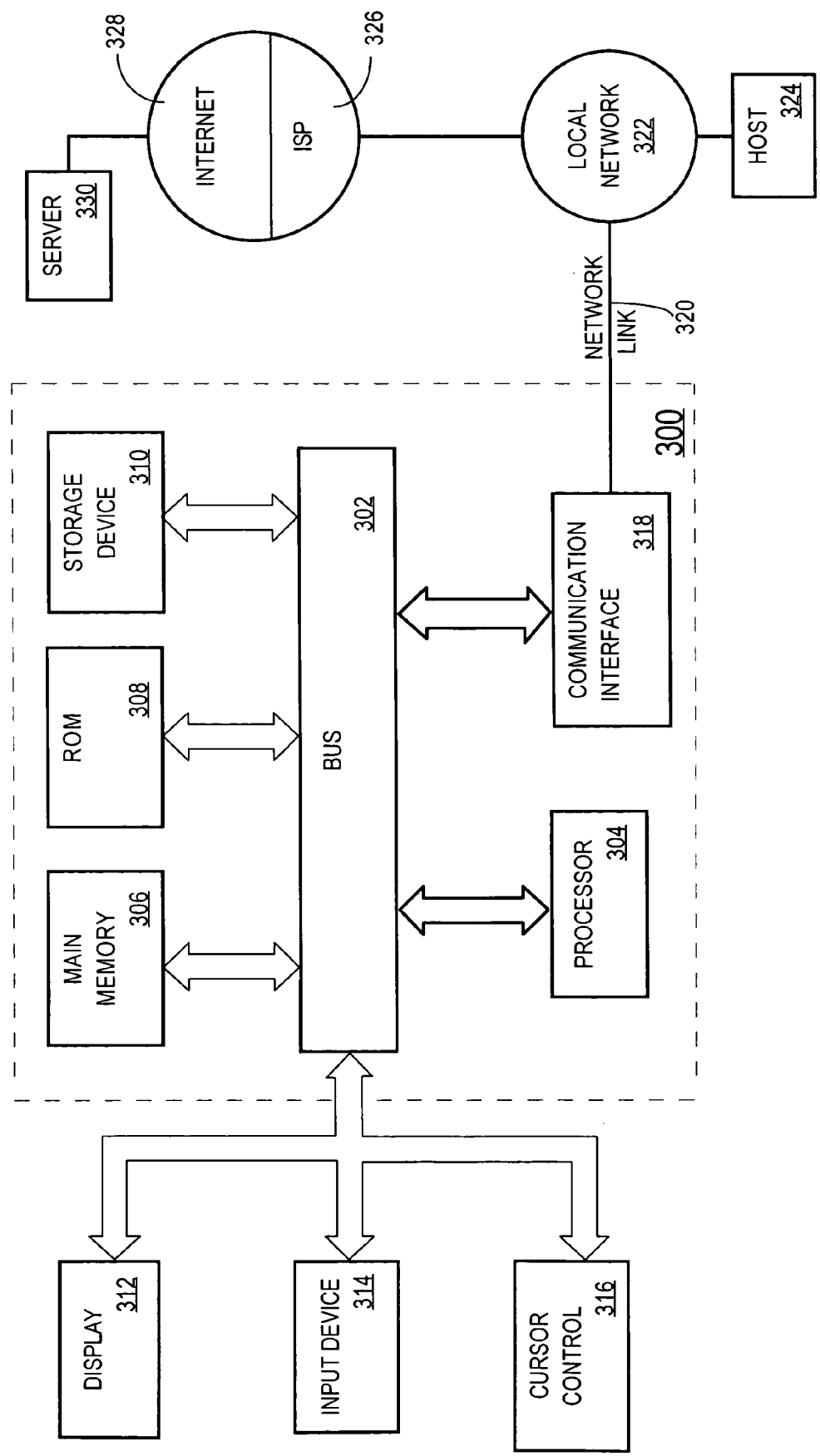
FIG. 3 is a diagram of a computer system according to an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, and volatile media. Non-volatile media includes, for example, optical or magnetic disks, such as storage device 310. Volatile media includes dynamic memory, such as main memory 306. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302.

Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of generating output for analyzing how well a query optimizer generates alternate execution plans and selects an optimal execution plan, the method comprising:
   receiving a query;
   in response to receiving the query, automatically performing:
      generating at least two alternate execution plans for the received query, wherein each alternate execution plan of the at least two alternate execution plans defines operations for executing said received query differently from each other alternate execution plan of the at least two alternate execution plans;
      for each execution plan of the at least two alternate execution plans, causing execution of said received query by a database server that performs the operations defined by the execution plan;
   wherein the step of causing execution of said received query for each execution plan of the at least two alternate execution plans causes at least two executions of the received query; and
   generating and storing output that describes characteristics of each of the at least two executions of said received query that is executed according to the operations defined by the execution plan of the at least two alternate execution plans;
   wherein the output is useable for analyzing how well the query optimizer generates alternate execution plans and selects the optimal execution plan;
   wherein the method is performed by one or more computing devices.

2. The method of claim 1, wherein:
   said step of generating at least two alternate execution plans is based on a set of parameters;
   said set of parameters specify one or more versions of said query optimizer upon which an alternate execution plan of said at least two execution plans should be based; and
   wherein generating said at least two alternate execution plans includes generating for each version of said one or more versions an alternate execution plan based on optimization behavior associated with said each version.

3. The method of claim 1, wherein the step of generating at least two alternate execution plans includes:
   generating a search space of a plurality of candidate execution plans; and
   selecting from the search space said at least two alternate execution plans.

4. The method of claim 3, wherein the step of selecting is based on an estimated query cost computed from a set of parameters.

5. The method of claim 3, further comprising:
   ranking the plurality of candidate execution plans based on at least one of the following metrics:
      estimated query cost,
      estimated CPU usage,
      estimated memory usage, and
      estimated disk input and output.

6. The method of claim 5, wherein said step of selecting said at least two alternate execution plans comprises selecting a set of top ranked candidate execution plans based on said step of ranking the plurality of candidate execution plans.

7. The method of claim 3, wherein said step of selecting said at least two alternate execution plans comprises randomly selecting at least one of said plurality of candidate execution plans.

8. The method of claim 1, wherein for the at least two alternate execution plans, said output indicates at least one of the following characteristics:
   a performance realized for each alternate execution plan of said at least two alternate execution plans,
   an indication of whether a first result returned for one of said at least two alternate execution plans differs from a second result for another of said at least two alternate execution plans, or
   an indication that an execution error was encountered during execution of said at least two alternate execution plans.

9. The method of claim 1, wherein said step of generating at least two alternate execution plans is based on a set of parameters that specify how to form execution plans.

10. The method of claim 9, wherein:
the set of parameters specify certain one or more execution plan operations to exclude; and
wherein the step of generating at least two alternate execution plans includes foregoing generation of execution plans that include said certain one or more execution plan operations.

11. The method of claim 9, wherein:
the set of parameters specify certain one or more execution plan operations to include; and
wherein the step of generating at least two alternate execution plans includes limiting generation of alternate execution plans to execution plans that include said certain one or more execution plan operations.

12. The method of claim 9, wherein:
the set of parameters specify at least one query transformation not to perform; and
the steps further include foregoing performing one or more query transformations of said each query that do not include said at least one query transformation.

13. The method of claim 9, wherein:
the set of parameters specify to perform at least one query transformation; and
the steps further include performing one or more query transformations in response to detecting that said set of parameters specify to perform said at least one query transformation.

14. The method of claim 1, further comprising, based at least in part on the output, analyzing whether the optimal execution plan selected by the optimizer was more efficiently executed than other alternate execution plans not selected by the optimizer.

15. A non-transitory computer-readable storage medium that stores instructions which, when executed by one or more processors, cause the one or more processors to generate output for analyzing how well a query optimizer generates alternate execution plans and selects an optimal execution plan by causing the one or more processors to perform:
receiving a query;
in response to receiving the query, automatically performing:
generating at least two alternate execution plans for the received query, wherein each alternate execution plan of the at least two alternate execution plans defines operations for executing said received query differently from each other alternate execution plan of the at least two alternate execution plans;
for each execution plan of the at least two alternate execution plans, causing execution of said received query by a database server that performs the operations defined by the execution plan;
wherein the step of causing execution of said received query for each execution plan of the at least two alternate execution plans causes at least two executions of the received query; and
generating and storing output that describes characteristics of each of the at least two executions of said received query that is executed according to the operations defined by the execution plan of the at least two alternate execution plans;
wherein the output is useable for analyzing how well the query optimizer generates alternate execution plans and selects the optimal execution plan.

16. The computer-readable storage medium of claim 15, wherein the instructions, when executed by the one or more processors, cause the one of more processors to perform said step of generating at least two alternate execution plans based on a set of parameters;
wherein said set of parameters specify one or more versions of said query optimizer upon which an alternate execution plan of said at least two execution plans should be based; and
wherein the instructions, when executed by the one or more processors, cause the one of more processors to perform said step of generating said at least two alternate execution plans by generating for each version of said one or more versions an alternate execution plan based on optimization behavior associated with said each version.

17. The computer-readable storage medium of claim 15, wherein the instructions, when executed by the one or more processors, cause the one of more processors to perform the step of generating at least two alternate execution plans by:
generating a search space of a plurality of candidate execution plans; and
selecting from the search space said at least two alternate execution plans.

18. The computer-readable storage medium of claim 17, wherein the instructions, when executed by the one or more processors, cause the one of more processors to perform the step of selecting based on an estimated query cost computed from a set of parameters.

19. The computer-readable storage medium of claim 17, wherein the instructions, when executed by the one or more processors, further cause the one or more processors to perform:
ranking the plurality of candidate execution plans based on at least one of the following metrics:
estimated query cost,
estimated CPU usage,
estimated memory usage, and
estimated disk input and output.

20. The computer-readable storage medium of claim 19, wherein the instructions, when executed by the one or more processors, cause the one of more processors to further perform said step of selecting said at least two alternate execution plans by selecting a set of top ranked candidate execution plans based on said step of ranking the plurality of candidate execution plans.

21. The computer-readable storage medium of claim 17, wherein the instructions, when executed by the one or more processors, cause the one of more processors to further perform said step of selecting said at least two alternate execution plans by randomly selecting at least one of said candidate execution plans.

22. The computer-readable storage medium of claim 15, wherein for the at least two alternate execution plans, said output indicates at least one of the following characteristics:
a performance realized for each alternate execution plan of said at least two alternate execution plans,
an indication of whether a first result returned for one of said at least two alternate execution plans differs from a second result for another of said at least two alternate execution plans, or
an indication that an execution error was encountered during execution of said at least two alternate execution plans.

23. The computer-readable storage medium of claim 15, wherein the instructions, when executed by the one or more processors, cause the one of more processors to perform said step of generating at least two alternate execution plans based on a set of parameters that specify how to form execution plans.

24. The computer-readable storage medium of claim 23, wherein:
the set of parameters specify certain one or more execution plan operations to exclude; and
wherein the instructions, when executed by the one or more processors, cause the one of more processors to perform the step of generating at least two alternate execution plans by foregoing generation of execution plans that include said certain one or more execution plan operations.

25. The computer-readable storage medium of claim 23, wherein:
the set of parameters specify certain one or more execution plan operations to include; and
wherein the instructions, when executed by the one or more processors, cause the one of more processors to perform the step of generating at least two alternate execution plans by limiting generation of alternate execution plans to execution plans that include said certain one or more execution plan operations.

26. The computer-readable storage medium of claim 15, wherein:
the set of parameters specify at least one query transformation not to perform; and
the instructions, when executed by the one or more processors, cause the one of more processors to further perform foregoing performance of one or more query transformations of said each query that do not include said at least one query transformation.

27. The computer-readable storage medium of claim 15, wherein:
the set of parameters specify to perform at least one query transformation; and
the instructions, when executed by the one or more processors, cause the one of more processors to further perform one or more query transformations in response to detecting that said set of parameters specify to perform said at least one query transformation.

28. The computer-readable storage medium of claim 15, wherein the instructions, when executed by the one or more processors, cause the one of more processors to further perform analyzing whether the optimal execution plan selected by the optimizer was more efficiently executed than other alternate execution plans not selected by the optimizer.

* * * * *

UNITED STATES PATENT AND TRADEMARK OFFICE
CERTIFICATE OF CORRECTION

| | | |
|---|---|---|
| PATENT NO. | : 7,877,373 B2 | Page 1 of 1 |
| APPLICATION NO. | : 11/484108 | |
| DATED | : January 25, 2011 | |
| INVENTOR(S) | : Zait | |

It is certified that error appears in the above-identified patent and that said Letters Patent is hereby corrected as shown below:

On Title Page, after item (65) insert -- (60) Related US Application Data
 Provisional Application No. 60/817,998 filed on Jun. 30, 2006. --.

On Title Page 2, in column 2, under item (56) "Other Publications", line 64, after "IEEE 1998," insert -- 0780347781, --.

On Title Page 2, in column 2, under item (56) "Other Publications", line 67, delete "ACM" and insert -- AC --, therefor.

On Title Page 3, in column 1, under item (56) "Other Publications", line 3, before "pp. 659-664." insert -- New York City, New York, USA, --.

In column 7, line 57, delete "Hardwire" and insert -- Hardware --, therefor.

Signed and Sealed this
Eleventh Day of October, 2011

David J. Kappos
*Director of the United States Patent and Trademark Office*